J. A. BROWN.
DEMOUNTABLE WHEEL RIM.
APPLICATION FILED JULY 20, 1917.
1,284,229.
Patented Nov. 12, 1918.
2 SHEETS—SHEET 1.
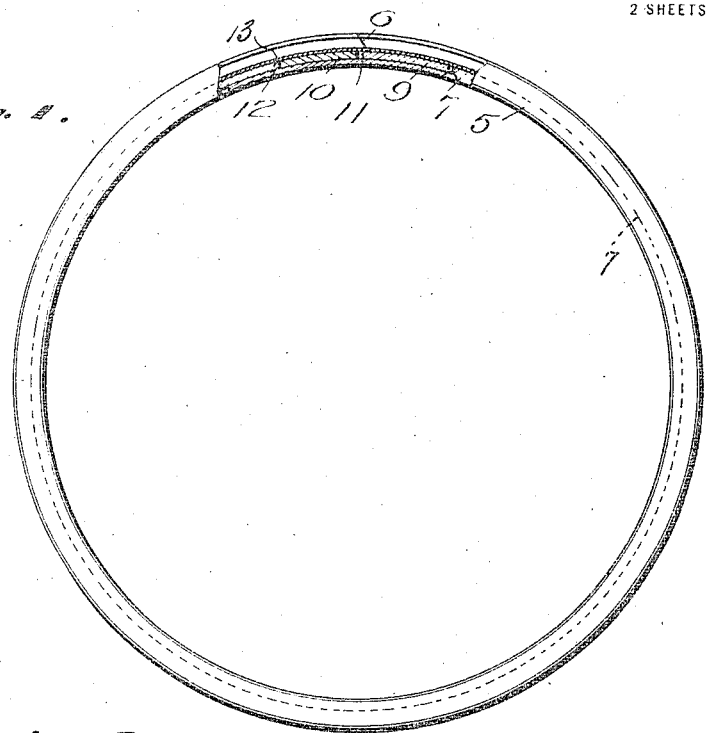
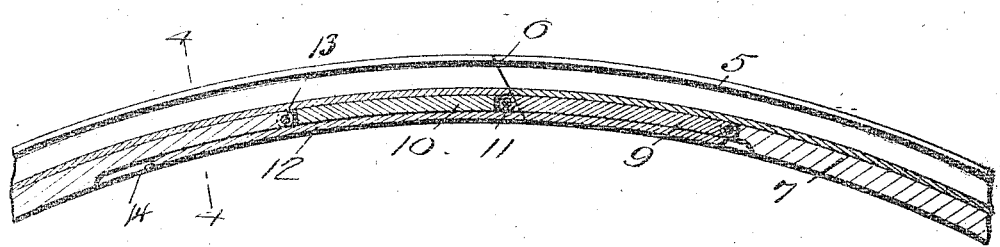
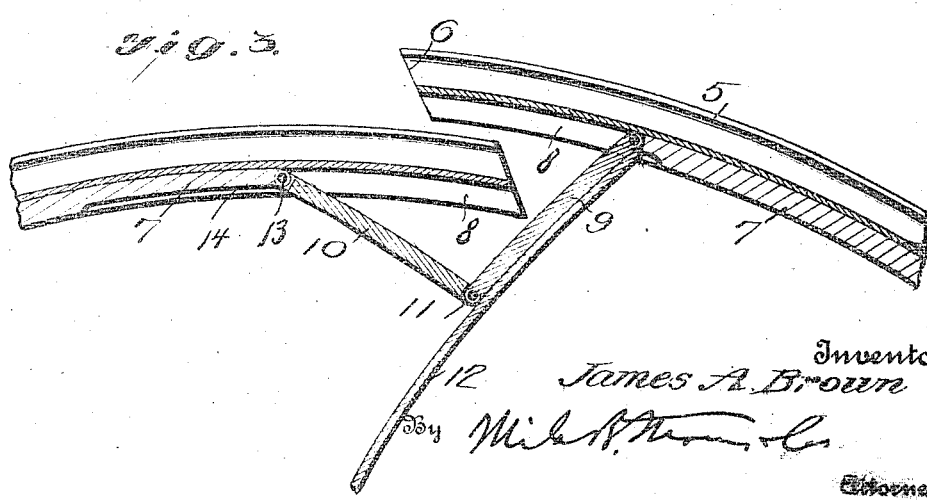
Inventor
James A. Brown

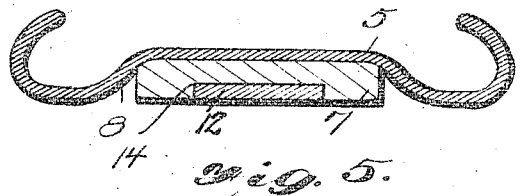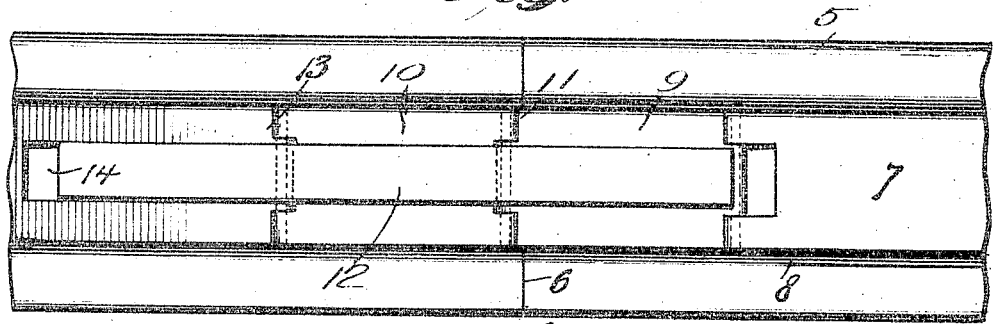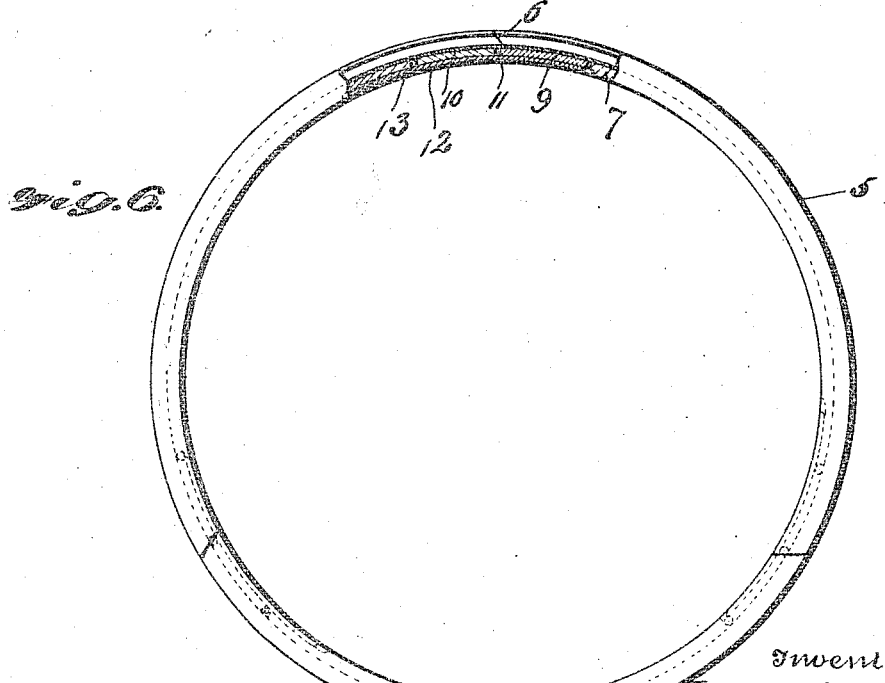

UNITED STATES PATENT OFFICE.

JAMES A. BROWN, OF CHICAGO, ILLINOIS.

DEMOUNTABLE WHEEL-RIM.

1,284,229.  Specification of Letters Patent.  Patented Nov. 12, 1918.

Application filed July 20, 1917. Serial No. 181,776.

*To all whom it may concern:*

Be it known that I, JAMES A. BROWN, a citizen of the United States, residing at Chicago, in the county of Cook and State of Illinois, have invented new and useful Improvements in Demountable Wheel-Rims, of which the following is a specification.

This invention relates to demountable wheel rims for carrying pneumatic and other tires, and more particularly rims of this kind which are split so that they may be contracted for the purpose of facilitating the application and removal of the tire.

The invention has for its object to provide in connection with a rim of the kind stated, a novel and improved means for contracting the same as will be described in detail hereinafter, and claimed.

In order that the invention may be better understood, reference is had to the accompanying drawing forming a part of this specification, and in said drawings, Figure 1 is an elevation of a demountable wheel rim, partly in section, showing the application of the invention; Fig. 2 is a longitudinal section of the device; Fig. 3 is a similar view showing the device swung to contract the rim; Fig. 4 is an enlarged cross section on the line 4—4 of Fig. 2; Fig. 5 is a plan view of the device, and Fig. 6 is an elevation of a rim, partly in section, showing a modification.

Referring specifically to the drawings, 5 denotes a tire-supporting rim which is adapted to be detachably mounted on the wheel in the ordinary manner. This rim is split transversely, as shown at 6, so that it may be contracted when the tire is to be put on or taken off and thus facilitate the application and removal of the tire. The present invention relates to a means for contracting the rim for the purpose stated, and it is composed of the following parts:

To the inner face of the rim 5 is riveted, or otherwise rigidly secured a ring 7 which is dimensioned to fit the rim on the inside. The ring is not as wide as the rim, and the latter has a channel 8 in its inner face in which the ring seats so as not to interfere with the attachment of the rim to the wheel.

In the ring 7 are interposed two hinged sections 9 and 10, respectively, which are pivotally connected, as shown at 11. These two ring sections form two toggle links for expanding and contracting the ring, and for the purpose of operating the toggle, the link 9 has a lever extension 12 which is curved in the direction of its length. This lever projects from the end of the link 9 which is pivoted to the link 10, and it extends across the pivot joint 11 and also along the under side of the link 10 and across its pivot joint 13 with the ring 7, when the toggle joint is closed.

The toggle links 9 and 10 are curved on the same radius as that of the ring 7, and when they are in alinement, they form a part of said ring so that its continuity is uninterrupted, and with the links in this position, the rim 5 is held expanded. However, when the toggle links are swung inward out of alinement, the rim 5 is contracted by reason of the fact that the links are connected thereto through the ring 7, and upon swinging the links back into alinement the rim is again expanded. The curvature of the lever 12 is such that it conforms to the curvature of the ring 7, and it fits closely against the toggle links and a portion of the ring when the latter is expanded, said parts being recessed, as shown at 14, to accommodate the lever. The ring is therefore devoid of projecting parts to interfere with the proper application of the rim 5 to the wheel.

Fig. 6 shows a rim split in three places and provided with a corresponding number of shrinking devices to produce more shrinkage.

I claim:—

The combination with a transversely split tire-carrying rim, of a pair of pivotally connected links pivoted to the rim at the split portion thereof, and a lever permanently connected to one of the links and projecting therefrom in longitudinal alinement therewith, for flexing the links to contract the rim, the other link being recessed to seat the projecting end of the lever.

In testimony whereof I affix my signature.

JAMES A. BROWN.